Feb. 25, 1930.                J. S. STEVENSON, JR                1,748,152
                                  BORING TOOL
                              Filed April 19, 1923
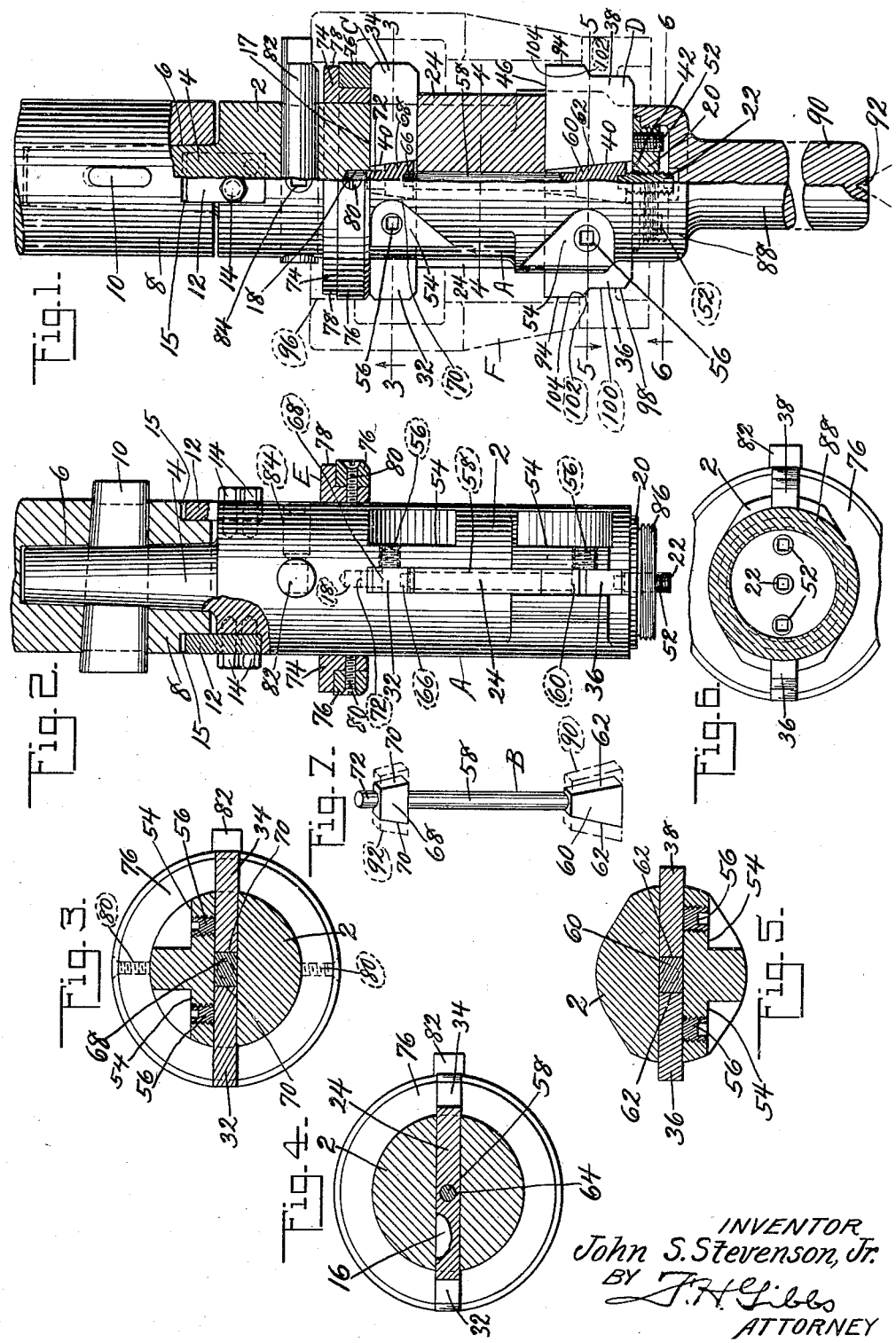
INVENTOR
John S. Stevenson, Jr.
BY J.H.Gibbs
ATTORNEY Patented Feb. 25, 1930

1,748,152

UNITED STATES PATENT OFFICE

JOHN S. STEVENSON, JR., OF EAST ORANGE, NEW JERSEY, ASSIGNOR TO AMERICAN CAR AND FOUNDRY COMPANY, OF NEW YORK, N. Y., A CORPORATION OF NEW JERSEY

BORING TOOL

Application filed April 19, 1928. Serial No. 271,192.

This invention relates to adjustable boring tools such as are used in boring mills, turret lathes, drill presses or the like, for boring metal.

One object of this invention is to provide a tool having a plurality of sets of cutters arranged longitudinally of its length, arranged in spaced relation and adapted to cut successively through a piece of metal.

Another object of the invention is to provide an improved assemblage of parts for a boring tool.

A further object of the invention is the provision of an adjustable boring tool which is formed of few parts, is strong and durable in operation and in which the parts are so formed and arranged that the cutters can be adjusted quickly, easily and accurately.

Other objects and advantages of this invention will be apparent from the following description taken in conjunction with the accompanying drawings in which similar characters of reference designate similar parts in the several views.

In the drawings:

Figure 1 is a front elevation of the boring tool of the present invention, a portion thereof being shown in section;

Fig. 2 is another view in elevation of the tool, certain parts also being shown in section, the view being taken on a different plane than that of Fig. 1;

Fig. 3 is a sectional view on the line 3—3 of Fig. 1;

Fig. 4 is a sectional view on the line 4—4 of Fig. 1;

Fig. 5 is a sectional view on the line 5—5 of Fig. 1;

Fig. 6 is a sectional view on the line 6—6 of Fig. 1; and

Fig. 7 is a front view of the expander used with the tool.

Referring now more particularly to the drawings, the stock or head of the tool is indicated generally at A, the same comprising a substantially cylindrical metallic bar 2 provided at its upper end with a reduced tapered stem 4 adapted to be received in a socket 6 formed in the end of a spindle, turret or other member 8 which carries the tool.

The stem 4 is provided with an aperture extending transversely therethrough, which is arranged to be alined with apertures formed in the member 8 whereby to receive a wedge key 10 for an obvious purpose.

The upper end of the stock A is provided with recesses in which locking dogs 12 are secured by suitable fasteners 14, said dogs extending beyond the upper edge of said stock and into recesses 15 formed in the member 8 and alined with the before-mentioned recesses in the stock, whereby to restrain the stock against relative movement with respect to said member 8 during operation of the boring tool.

The stock A is preferably formed of a single piece of metal comprising the bar 2, and the same is provided with a vertically arranged slot 16 extending transversely therethrough. The upper wall 17 of the slot is provided with an internal recess 18 which is substantially centrally arranged and which leads from the slot 16, as clearly shown in Fig. 1, and said recess 18 is alined with an aperture formed in the lower end 20 of the bar 2, said aperture being tapped to secure an adjusting screw 22 for a purpose hereinafter to be described.

The slot 16 is adapted to receive a spacer element 24, an expander indicated generally at B and the sets of cutters C and D in a manner presently to be described.

The upper set of cutters is indicated at C and the lower set of cutters is indicated at D; the set C comprising the oppositely extending cutters 32 and 34 respectively, which may be of any desired or preferred shape, depending upon the cut to be made while the lower set of cutters D comprises the oppositely extending cutters 36 and 38 respectively, which also may be of any desired or preferred shape depending upon the cut to be made. The lower set of cutters are alined with the upper set of cutters, and each cutter is provided with an inner upwardly bevelled edge 40 for adjusting purposes, as hereinafter described.

The lower cutters 36 and 38 are arranged in opposed relation, as shown in Fig. 1, and are seated upon the lower wall 42 of the slot 16 and are arranged to project outwardly beyond the outer surface of the bar 2.

For retaining the cutters in their spaced relation, the spacer block 24 heretofore mentioned is preferably employed, the same being a single block of metal of elongated form and of such thickness as to nicely fit in the slot 16, and of such length as to rest upon the upper edge 46 of the opposed lower cutters D and to support the upper cutters C in sliding contact with the upper wall 17 of the slot 16.

For the purpose of providing a close and tight fitting association or assembly of the upper and lower sets of cutters and the spacer with the head A, set screws 52 are employed which extend through the lower end 20 of the bar 2, and as will be apparent, said screws bear against the lower edges of the lower set of cutters D and may be adjusted to force the cutter D upwardly, thereby forcing the spacer 24 and the upper cutters C upwardly in contact with the upper wall 17 of the slot 16 whereby the cutters C and D and the spacer element are firmly united in assembled position.

The bar 2 is provided with a flattened portion or recess 54 opposite each cutter, said flattened portions having tapped apertures therein through which set screws 56 extend to bind against the cutters to retain the latter in any desired adjusted position.

The cutters C and D must of course be horizontally adjustable, and to effect this result, the expander B shown in Fig. 7 is employed, the same comprising a cylindrical rod 58 provided with a wedge element 60 at its lower end; said wedge element being formed in any desired manner as by upsetting the end of the rod or by attaching a separate element thereto, the wedge element having the oppositely arranged bevelled faces 62. The spacer element 24 is provided with a central slot 64 extending therethrough and through which the rod 58 extends, said rod being of such length that the upper end thereof will project above the spacer element. When the rod is positioned in the slot 64, the wedge element 60 is arranged between the bevelled ends 40 of the lower cutters D and is normally in contact therewith. The upper end of the rod 58, as before-mentioned, extends above the spacer element 24, and as shown in Fig. 1, the upper end is reduced as at 66 to position an upper wedge element 68. The upper wedge element is provided with oppositely arranged bevelled faces 70 and with a recess formed in its lower face into which the reduced end 66 of the rod 58 extends; the wedge element thus being supported by said rod 58, and the wedge element is further provided with a stem 72 which is arranged in the before-mentioned recess 18. The lower face of the wedge element 60 is provided with a recess into which the upper end of the set screw 22 extends.

The stock A is provided with an upper pilot arranged above the upper set C of the cutters, the pilot being indicated generally at E and comprising the angle ring 74 which is secured to the stock in such a manner that there is no relative movement between said ring and stock. It has been found satisfactory to secure the ring 74 to the stock by shrinking it thereon, but this is merely by way of example, as obviously the ring may be secured to the stock in any suitable or desired manner. The pilot also includes a pilot ring 76 positioned in the angle of the ring 74 and of such diameter as to project slightly beyond the outer face 78 of the angle, as clearly shown in Fig. 2. For securing the pilot ring 76 to the angle ring 78, any suitable means may be employed, but for illustrative purposes, the countersunk screws 80 are shown. By providing the pilot ring 76 as a removable element, it will be apparent that pilot rings of varying sizes may be employed to suit the particular "job"; that is, pilot rings of various diameters may be employed with the tool. The block 2 above the upper set of cutters is provided with a transversely arranged aperture which receives a facing cutter 82 which is retained in desired position by a set screw 84.

In certain instances, it is desirable to provide a lower pilot, and for this purpose, the lower wall 20 of the block 2 is reduced as shown at 86 and is externally threaded to secure the upper threaded end of a lower pilot 88 which is provided with a stem 90 having a recess 92 formed in the lower end thereof for positioning the tool on a suitable base during operation.

It is believed that the construction of the boring tool just described will be apparent to those skilled in the art, but a brief résumé of the assembling of the several parts and the operation thereof is deemed necessary.

In forming the tool of the present invention, more particularly assembling the several parts of the stock, it will be apparent that the angle ring 74 of the upper pilot E is shrunk on to the stock in the first instance, and the pilot ring 76 is then secured to the angle ring 74 by means of the screws 80 or the like. The stock A with its angle ring 74 is then ready for the assembling of the various parts of the tool to effect a complete structure, and to that end the set screws 22 and 52 are retracted until their upper ends are arranged within the lower wall 20. It is usual and easier in the assembling of the tool to reverse the position of the bar 2 and when this has been done, the upper wedge element 68 is inserted through the slot 16 until the stem 72 thereof is seated in the recess 18. The cutter element 32 is then inserted in the slot 16, the same being supported by the upper wall 17 of the slot 16, the cutter 32 being pushed inwardly until its bevelled edge contacts with one of the bevelled edges of the upper wedge element 68. The spacer element 24 with the rod 58 of the expander B arranged in the central aperture therein is then placed in the slot 16 with the upper wall thereof resting upon the lower surface of the cutter 32. Because of the recess 18, it is apparent that the upper wedge element 68 of the expander will seat upon the upper wall 17; in other words, the stem 72 thereof will enter the recess 18. This will permit the upper reduced end of the rod 58 to be alined with the recess 66 formed in the lower wall of the upper wedge element 68, and further, the upper end of the rod 58 is permitted to aline itself with said recess because of the fact that when the wedge element seats on the upper wall 17 of the slot 16, sufficient clearance is provided for the upper reduced end 66 to pass the upper wedge element 68 whereby to aline itself with the recess in the upper wedge element, and the parts should be proportioned to permit this.

The cutter 34 may then be inserted between the upper wall 17 of the recess and the spacer element, and then the cutters 36 and 38 may be inserted between the lower wall 20 of the bar 2 and the lower wall of the spacer element. The parts having been thus assembled, the set screws 52 may be adjusted to force the cutters 36 and 38, and consequently the spacer 24 and the cutters 32 and 34 toward the upper wall 17 of the slot 16. It is not necessary at this time to effect an extremely tight connection or arrangement of the cutters in the bar for the reason that it is necessary to adjust the cutters horizontally to a predetermined position. The parts having been assembled as described, the bar 2 may be reversed to its normal position whereupon the upper wedge element 68 will be engaged with the upper reduced end 66 of the rod 58. For adjusting the sets of cutters C and D, the set screw 22 may be actuated whereby the bevelled surfaces 62 and 70 of the lower and upper wedge elements respectively will engage the inner bevelled ends of the several cutters and force the same outwardly to a desired position. The position having been accurately ascertained and effected, the set screws 56 are then actuated to secure the cutters in their desired adjusted position. This having been accomplished, the facing cutter 82 is then adjusted and the tool is ready for use. In use the tool is held stationary and the work is rotated about the tool. The work is shown in dotted lines at F and in the instance shown is a tank car valve cage which is usually of cast metal. The work F is supported in such a manner as to rotate so that the tool may pass downwardly through the work during the rotation of the latter. As the tool is passed downwardly through this work F the edges 94 of the cutters 36 and 38 first cut through and form the wall 96 and the tool then passes downwardly and the cutters 32 and 34 function to finish the previously cut wall 96 in a well known manner, and when this has been done, the cutting edges 98 of the cutters 36 and 38 cut the wall 100 and also form a valve seat 102 by reason of the angular cutting edge 104. After the cutters 32 and 34 have performed their work, the upper pilot E is positioned adjacent the wall 96 and preferably in contact therewith whereby to guide the tool during its operation.

The expander, as before-mentioned, comprises a rod 58 having wedge elements at the opposite ends thereof. The wedge element 60 is shown in the drawings as integral with the rod 58 but this is merely for illustrative purposes, as obviously the wedge element 60 may be a separate element if desired which may be rigidly or otherwise secured to the rod 58. For convenience, however, it has been found highly satisfactory to rigidly secure the wedge element 60 to the lower end of the rod 58, as shown in said Fig. 7. The wedge element at the upper end of the rod is shown as detachably connected to the rod by merely seating upon a reduced portion at the end of said rod.

It is apparent that this particular arrangement of parts permits the utilization of various sized upper wedge elements in accordance with the particular cut to be made and in accordance with the particular "job" to be done. For example, it is possible by this construction to provide upper and lower wedge elements in the formation of an expander, which wedge elements are of relatively different size. Further, it will be apparent that the expander of the present invention may be substituted for an expander having larger sized wedge blocks to compensate for wear of the cutter elements; in other words, after continued usage, the cutter elements may be worn away to such an extent that the wedge elements will not function to accomplish the necessary adjustment. In this event, an element comprising the rod 58 with a larger sized lower wedge element may be substituted for the corresponding elements shown in Fig. 7; said substituted element, more particularly the enlarged wedge element, being shown in broken lines in said Fig. 7 at 90. The rod of the substituted expander element, of course, is of the same size as that shown at 58 in Fig. 7, and with this substituted expander element, an enlarged upper wedge element may be employed such as illustrated in broken lines at 92 in Fig. 7. This substituted element, it is apparent, will permit an adjustment of the cutter elements to a greater degree than the previously used expander element. All in all, the present arrangement comprises a tool in which the cutter elements may be adjusted relative to each other in various degrees, the adjustment of said cutter elements being accomplished by the simultaneous actuation of the spaced wedge elements of the expander, thereby resulting in a simultaneous adjustment of the upper and lower cutter elements.

It is believed that the invention will be fully apparent to those skilled in the art from the foregoing description taken in conjunction with the accompanying drawings, but it is to be understood that the drawings are for illustrative purposes only and that various changes in the form and proportions of the device may be made within the scope of the appended claims without departing from the spirit of the invention.

What is claimed is:

1. In a boring tool, the combination of a metallic bar, spaced sets of cutters in said bar, a spacer for retaining the sets of cutters in spaced relation, and an expander provided with spaced wedge elements mounted in the bar and guided by said spacer for vertical movement to adjust the cutters in unison.

2. In a boring tool, the combination of a metallic head provided with a vertically arranged slot extending transversely therethrough, sets of cutters arranged in the slot adjacent the upper and lower walls thereof, a spacer positioned between said sets of cutters for retaining them in spaced relation, an expander in the head positioned by said spacer and having wedge elements at the ends thereof normally engaged with the cutters, and means for adjusting the position of the expander to vary the position of the sets of cutters simultaneously.

3. In a boring tool, a head having a slot extending therethrough, a plurality of sets of cutters in said slot, a spacer for retaining the sets of cutters in spaced relation, each set of cutters having oppositely arranged cutting elements and said spacer having a vertical opening therethrough, an expander in said opening and guided thereby and including wedge elements at each end thereof normally in contact with the cutter elements, means for securing the cutters and spacer element in assembled relation against displacement, and means for actuating the wedge elements simultaneously to vary the positions of all of said cutters simultaneously and to relative predetermined amounts.

4. In a boring tool, in combination. a head, spaced sets of cutters arranged in said head, a spacer for retaining the sets of cutters in spaced relation, and an expander for simultaneously adjusting the sets of cutters horizontally to a relative predetermined amount.

5. In a boring tool, in combination, a head, spaced sets of cutters arranged in said head, a spacer for retaining the sets of cutters in spaced relation, and an expander working through the spacer element to be positioned and guided thereby for simultaneously adjusting the sets of cutters horizontally to a relative predetermined amount.

6. In a boring tool, in combination, a head, spaced sets of cutters arranged in the head, a spacer for retaining the sets of cutters in spaced relation, a plurality of wedge elements normally engaging the sets of cutters, means connecting the wedge elements whereby the latter may be simultaneously actuated, and means for actuating the wedge elements whereby to horizontally adjust the sets of cutters simultaneously and to a predetermined degree.

7. A boring tool comprising a cylindrical head having a vertical slot extending transversely therethrough, sets of cutters arranged adjacent the upper and lower walls of the slot, each set including oppositely arranged cutter elements extending radially outward from the head, a spacer element in said slot for retaining the cutter elements in spaced relation, adjustable means for securing the spacer element and cutters against longitudinal movement in the slot, said spacer element having an opening extending longitudinally thereof substantially midway of its side edges, an expander element guided in the spacer element opening and having an integral wedge shaped lower end normally engaging one set of cutters, a detachable wedge element mounted on the upper end of the expander element and normally engaging the other set of cutters, and means for moving the expander element longitudinally in the slot to simultaneously actuate the wedge elements whereby to vary the horizontal positions of the sets of cutters simultaneously to relative predetermined amounts.

8. A boring tool comprising a cylindrical head having a vertical slot extending transversely therethrough, sets of cutters arranged adjacent the upper and lower walls of the slot, a spacer for retaining the sets of cutters in spaced relation, said spacer being provided with a longitudinal opening, an expander element mounted in the opening, wedge means carried by one end of the element and adapted to engage one set of cutters, a second wedge means detachably carried by the other end of the element and adapted to engage the other set of cutters, and means for actuating the wedge means simultaneously whereby to simultaneously adjust the sets of cutters.

9. A boring tool comprising a head, spaced sets of cutters in the head, means for retaining the cutters in spaced relation, and means comprising simultaneously adjustable plural wedge elements for simultaneously adjusting the sets of cutters.

10. In a boring tool, the combination of a slotted bar, spaced sets of cutters at the ends of said slot, a spacer separating said sets of cutters and an expander for said cutters mounted in said spacer, said expander comprising similarly positioned wedge blocks engaging said sets of cutters.

11. In a boring tool, the combination of a slotted bar, spaced sets of cutters at the ends of said slot, a spacer separating said sets of cutters and an expander for said cutters mounted in said spacer, said expander comprising wedge blocks engaging said sets of cutters and adjustable simultaneously in the same direction to adjust said sets of cutters.

12. In a boring tool, the combination of a head having a slot extending therethrough, sets of cutters at the ends of said slot, a spacer separating said sets of cutters, an expander extending through said spacer, and adjusting means mounted in said head and engaging an end of said expander, said expander comprising wedge blocks engaging said sets of cutters and adjustable simultaneously in the same direction to adjust said cutters.

In witness whereof I have hereunto set my hand.

JOHN S. STEVENSON, Jr.